United States Patent
Hämäläinen

Patent Number: 5,395,595
Date of Patent: Mar. 7, 1995

[54] FLUIDIZED BED REACTOR

[75] Inventor: Matti Hämäläinen, Monninkylä, Finland

[73] Assignee: Neste Oy, Espoo, Finland

[21] Appl. No.: 46,557

[22] Filed: Apr. 12, 1993

[30] Foreign Application Priority Data

Apr. 10, 1992 [FI] Finland .................. 921632

[51] Int. Cl.⁶ .............. C08F 2/00; B01J 8/18; B26B 17/00; F23G 5/00
[52] U.S. Cl. .................. 422/135; 422/131; 422/139; 422/143; 422/311; 122/4 D; 34/443; 34/498; 110/245
[58] Field of Search .............. 422/131, 135, 139, 143, 422/311; 122/4 D; 34/57 A; 110/245, 312

[56] References Cited

U.S. PATENT DOCUMENTS

| | | | |
|---|---|---|---|
| 2,664,346 | 12/1953 | Mayhew | 122/4 D |
| 2,891,846 | 6/1959 | Knight | 422/143 |
| 2,931,711 | 4/1960 | Walker | 122/4 D |
| 3,737,288 | 6/1973 | Hochman | 23/285 |
| 4,366,123 | 12/1982 | Kato et al. | 422/135 |
| 4,685,809 | 8/1987 | Hüttlin | 366/101 |
| 4,725,409 | 2/1988 | Wolf | 422/145 |
| 4,755,358 | 7/1988 | Voll et al. | 422/106 |
| 4,796,691 | 1/1989 | Large et al. | 165/104.16 |
| 4,817,563 | 4/1989 | Beisswenger et al. | 122/4 D |
| 4,877,587 | 10/1989 | Rhee et al. | 422/135 |
| 4,967,688 | 11/1990 | Funakoshi et al. | 118/303 |
| 5,102,628 | 4/1992 | De Lasa | 422/140 |

FOREIGN PATENT DOCUMENTS

| | | | |
|---|---|---|---|
| 880717 | 8/1988 | Finland . | |
| 1632404 | 8/1970 | Germany . | |
| 3523990 | 2/1986 | Germany . | |
| 0078286 | 5/1985 | Japan | 422/143 |
| 0804365 | 11/1958 | United Kingdom | 422/143 |

OTHER PUBLICATIONS

"Apparatus for treating materials in a fluidized bed", M. M. Artyushin et al., abstract No. 128208q, Chemical Abstracts, vol. 98, No. 16, Apr., 1983.

Primary Examiner—Robert J. Warden
Assistant Examiner—Christopher Y. Kim
Attorney, Agent, or Firm—Steinberg, Raskin & Davidson

[57] ABSTRACT

The present invention relates to a fluidized bed reactor in which olefins are polymerized or copolymerized in a bed formed by particles being polymerized and fluidized with the aid of a circulating gas. In the reactor, a circulating gas is fed from a gas space above the fluidized bed into the lower part of the reactor. The lower part of the reactor includes an annular space having an defined by an upwards tapering rotating conical surface and an outer wall defined by a downwards tapering rotating conical surface.

20 Claims, 1 Drawing Sheet

FLUIDIZED BED REACTOR

BACKGROUND OF THE INVENTION

The present invention relates to a fluidized bed reactor for polymerizing or copolymerizing olefins. More particularly, the invention relates to formulation of the bottom part of such a fluidized bed reactor. The invention also relates to a method for polymerizing olefins in a fluidized bed reactor.

Fluidized bed reactors are generally used in continuous-action gas-phase polymerization processes for producing olefin polymers. In a fluidized bed reactor, the polymerization is accomplished in a fluidized bed formed by the polymerization of polymer particles. The bed is maintained in a fluidizing state with the aid of a circulation gas flow directed upwards from the bottom part of the reactor. The circulation gas flow includes gaseous hydrocarbon diluting agents and/or inert gases. In addition, the monomers to be polymerized may be added into the circulating gas line. The circulating gas flow is removed from the gas volume at the top part of the reactor and conducted into thermal exchangers for conveying off the heat produced during the polymerization. Thereafter, the gas flow is returned to the lower part of the reactor with the aid of a compressor.

It is important that the circulating gas in the fluidized bed conducted to the lower section of the reactor be uniformly distributed in order to maintain a uniform fluidization state. Flow division means in the form of a perforated intermediate floor is generally used for distributing the circulating gas. The division means is located adjacent to the lower section of the reactor. Thus, an inlet or mixing chamber for the circulating gas is formed in the bottom part of the reactor and is separated from the fluidized bed by the flow division plate, i.e., separated from the actual polymerization section of the reactor.

It is more difficult to uniformly distribute the circulating gas in the fluidized bed onto the entire cross-section area of the reactor as the reaction size increases. As a result of an uneven distribution, denser and less well fluidizing areas are created, particularly in the vicinity of the reactor walls. This problem is worse when liquid fractions enter along with the circulating gas. This makes it particularly difficult to distribute the liquid phase uniformly within the fluidized bed. Therefore, local heating and agglomeration of polymer particles into larger lumps occur in the fluidized bed, as well as the catching of agglomerates onto the reactor surfaces.

For improving the distribution of the gas flow, prior art devices use gas division plates in which the size, shape and positioning of apertures have been modified. However, it is a significant drawback of such prior art devices that production of these specifically structured gas division plates is expensive and the gas permeability may be inadequate, thus causing unneeded pressure drops in the gas circulation flowing through the reactor.

A second common problem related to the increased fluidized bed reactor size is the agglomerization of polymer particles and their catching on the wall surfaces of the bottom section of the reactor. Some small polymer particles containing an active catalyst tend to pass from the reactor together with the circulating gas. These particles return to the bottom part of the reactor with the circulating gas. If the circulating gas is conducted into the reactor in a conventional manner through a straight tubular connector placed in the bottom of the reactor and, if the flow conditions or the shape of the bottom section of the reactor are not optimal, local flows are produced in the circulating gas inlet chamber adjacent to the area where polymer particles are gathered.

In order to eliminate these drawbacks, some suggestions have been made as to the use of various flow spreading means in conjunction with the circulation gas feed tube. Thus, for instance, in U.S. Pat. No. 4,877,587, dispersion means have been attached on one end of the circulation gas feed tube in the bottom of the reactor to separate the flow from the tube into two parts so that part of the flow turns outward and the rest of the flow goes upwards. With designs such as these, it has not been entirely possible to avoid flows circulating in one place from occurring in the bottom part of the reactor. This results in agglomeration and the catching of polymer particles onto the walls. Other drawbacks include the fact that cleaning the dispersion means is a cumbersome procedure and if one wants, for one reason or another, to employ a different design, dismounting and replacing the dispersion means is difficult and requires a shut-down and an opening of the reactor.

A typical bottom shape of a fluidized bed reactor forms a more or less spherical surface, for instance the device described in U.S. Pat. No. 4,877,587. An advantage of this typical bottom shape in comparison with a planar bottom, is that there will not be any areas having sharp angles produced in the vicinity of the lower part of the wall where, consequently, the gas flow is poor and, therefore, any such sharp angles would cause agglomeration of polymer particles. An arrangement wherein the circulating gas is conducted into a reactor through an inlet aperture or tube located in the center point of the bottom of the reactor, would be unsuccessful in reactors of production scale in which the cross-sectional area of the bottom of the reactor might be well over several meters.

OBJECTS AND SUMMARY OF THE INVENTION

An object of the present invention is to provide a new and improved fluidized bed reactor which has a bottom part arranged in order to eliminate the problems of the prior art devices.

It is another object of the present invention to provide a new and improved method for polymerizing or copolymerizing olefins in a fluidized bed reactor in which the drawbacks of the prior art devices are substantially eliminated.

Briefly, the present invention relates to a fluidized bed reactor in which olefins are polymerized or copolymerized in a bed fluidized with the aid of circulating gas and formed of the particles to be polymerized. The reactor is provided with means to feed a circulating gas from a gas space above the fluidized bed into a lower or bottom section of the reactor, which is separated from the upper section of the reactor by means of a flow division plate. In accordance with the invention, the bottom section of the reactor comprises an annular space about which an inner wall is defined by an upwards tapering rotating conical surface and an outer wall is defined by a downwards tapering rotating conical surface. A bottom or lowermost surface of the bottom section of the reactor is defined by an annular surface having a rounded cross-section connecting the rotating conical surfaces.

The use of the bottom part to resemble a "cake mould" in fluidized bed polymerization reactors is a novel feature of this invention. Externally, a similar bottom design has been introduced earlier for use in, e.g., solution polymerizing reactors. Thus, U.S. Pat. No. 3,737,288 discloses a reactor provided with an internal flow tube in which a polymerizing solution is, with the aid of propeller parts, circulated along an inner tube upwards into the upper part of the reactor and the solution flows back into the lower part of the reactor along the inner wall of the reactor. The sole purpose of the bottom shape disclosed in that U.S. patent is to provide the usual "roundings" for turning the liquid phase flow from a smooth downflow into an upflow.

In contrast to U.S. Pat. No. 3,737,288, it is an object of the present invention to provide a gas flow distributed uniformly on the entire cross-section area of the reactor upwards from the bottom part of the reactor.

The "cake mold" shape is a generally familiar concept related to cake molds used in the kitchens. A shape such as this suggests that the center region of the bottom is lifted upwards. The bottom shape used generally in the reactor in accordance with the present invention may be defined as an annular space, the inner wall thereof being defined by an upwards tapering conical rotating surface and the outer wall thereof being defined by a downwards tapering conical rotating surface. Thus, the lowest point of the bottom part of the reactor of the present invention, and formed by the method in accordance with the invention, should consist of a sharp corner produced in the junction of the two conical rotating surfaces. However, this kind of sharp-angled design is not very desirable. In order to avoid sharp angles and corners, the lowest point of the bottom part of the reactor is constructed in a rounded manner.

Another advantage of the bottom structure of the present invention, relates especially to reactors having a large diameter in which it is difficult to stiffen the flow division plate situated in the region of the bottom part of the reactor according to the conventional technique. In accordance with the invention, the flow division plate can be advantageously supported on the upper end of the uplifted center part of the bottom part of the reactor, whereby the flow division plate can be made as thin as possible. This is advantageous to the operation of the reactor.

In the method in accordance with the invention, a bed is produced in an upper part of the reactor in which olefins are polymerized or copolymerized from particles of the olefins to be polymerized. A circulating gas is directed into a lower part of the reactor which comprises an annular space defined by an inner upwards tapering rotating conical surface and an outer downwards tapering rotating conical surface. An annular surface having a rounded cross-section is arranged between the outer conical surface and the inner conical surface such that the circulating gas is directed into the lower part of the reactor through feed apertures in the annular surface. The lower part of the reactor is separated from the upper part of the reactor such that the circulating gas is passed from the lower part of the reactor to the upper part of the reactor to fluidize the olefins in the upper part of the reactor.

In preferred embodiments of the method, the circulating gas is uniformly distributed across the cross-sectional area of the lower part of the reactor. The annular surface may be connected to the outer and inner conical surfaces. The olefins in the bed may be mixed by means of a mixing shaft having a bearing supported on an uplifted center part of the outer tapering conical surface.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
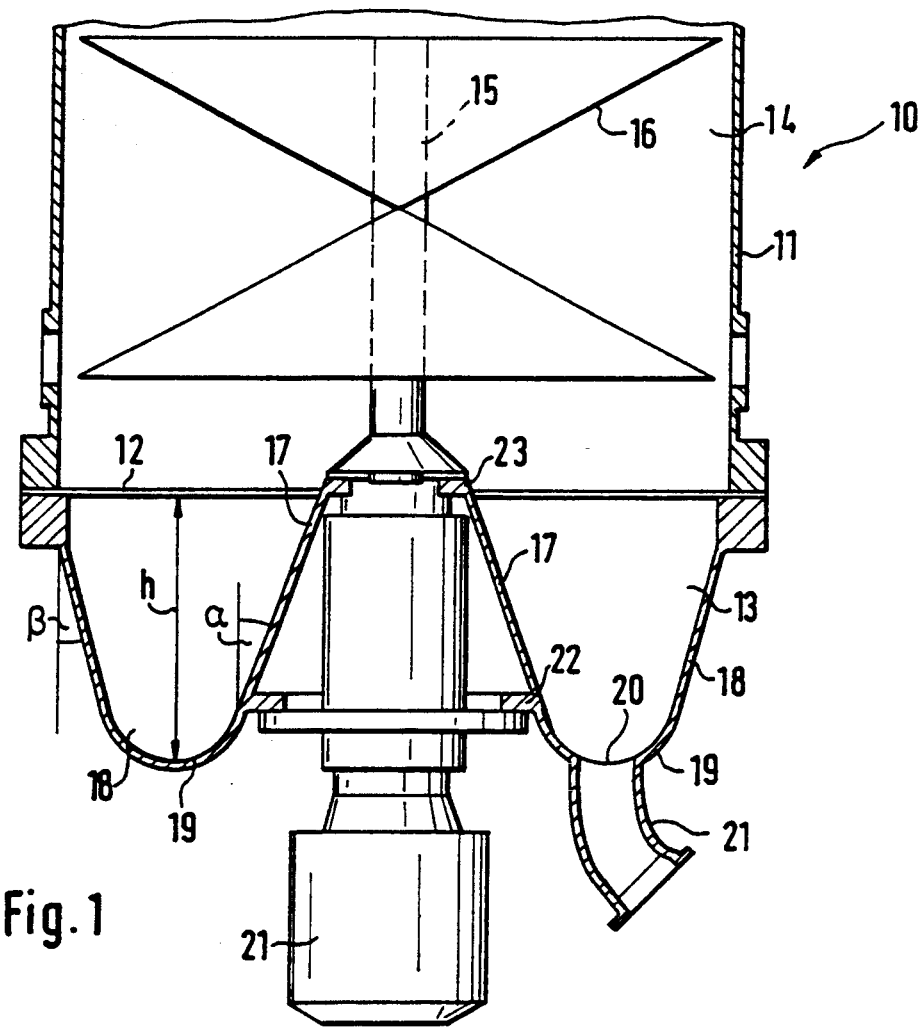
FIG. 1 shows an elevational view of the bottom part of a reactor in accordance with the invention and used in a method in accordance with the invention.
Figure 2:
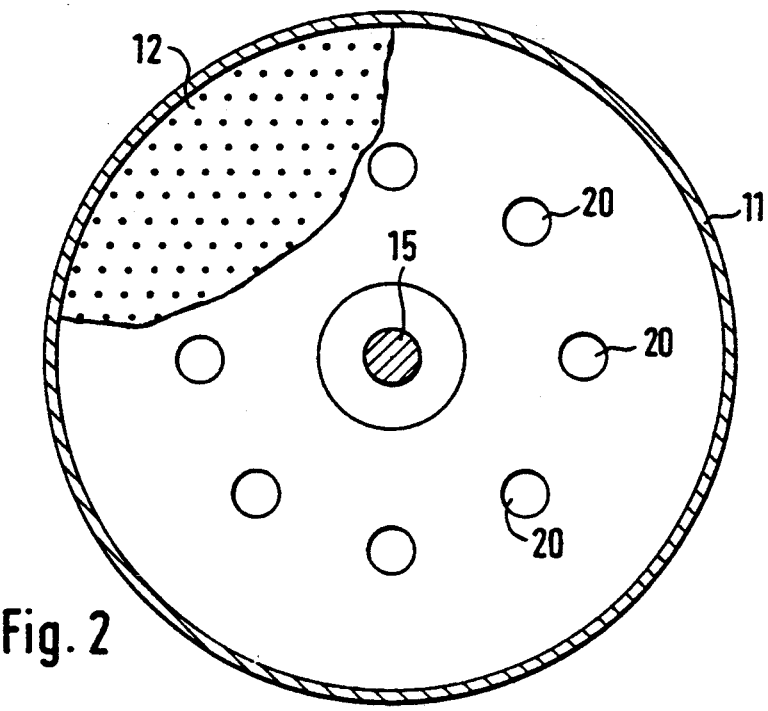
FIG. 2 shows a top view of the bottom part of the reactor in accordance with the invention and used in a method in accordance with the invention.

In FIGS. 1 and 2, the fluidized bed reactor is generally indicated by reference numeral 10. The reactor 10 is provided with a cylindrical outer wall 11. A perforated flow division plate 12 divides the reactor into a fluidized gas inlet part 13 and a fluidized bed part 14. As shown in FIG. 2, the flow division plate 12 is partly open sectioned. In one embodiment of the present invention, the reactor 10 has also been provided with mixing means, i.e., a mixing element, 16 rotated by a shaft 15.

The bottom part of the reactor 10 consists of two nested conical surfaces, an inner conical surface 17 tapering upwards and an outer conical surface 18 tapering downwards. The conical surfaces 17 and 18 form an shape which is substantially semicircular and are connected by an annular section 19. The annular section 19 constitutes the lowermost part of the bottom of the reactor. The cone shape of the inner conical surface 17, i.e., the cone angle deviating from the vertical line, is indicated by reference character e. The cone shape of the outer conical surface 18 is respectively indicated by reference character $\beta$. The height of the bottom part, i.e., the distance from the lowest point of the bottom part to the flow division plate 12 is indicated by letter h. The flow division plate 12 is preferably attached to a support point indicated by reference numeral 23 for supporting the plate 12. Support point 23 may be an uplifted center point of the bottom part of the reactor, preferably a part of the upwards tapering rotating conical surface 17.

Inlet apertures 20 for the circulating gas have been produced in the lowest point of the bottom part 13. The circulating gas is conducted through the apertures 20 from a circulating gas tube or tubes 21 into the reactor bottom part 13 and then on through the flow division plate 12 into the fluidized bed section 14. In order to provide a smooth flow, there may be a plurality of apertures 20 and they have been positioned preferably in symmetry.

An electro-motor 21 with accompanying bearings rotates the mixing shaft 15 and is preferably positioned inside the wall section defined by the inner conical surface 17 at support points indicated by reference numerals 22 and 23. A firm fixing is thus achieved, and the mixing shaft 15 needs no upper supporting bearings in the fluidized bed section 14, i.e., there are no bearing arranged in the interior of the reactor. The mixing shaft 15 may also be arranged to rotate the bottom part 13 via the support points 22 arranged on the upwards tapering rotating conical surface 17.

In the present invention, the bottom part of the reactor consists of two nested cones, the inner one 17 tapering upwards and the outer one 18 downwards. Tower parts of the conical surfaces are connected with a ring or annular section 19, the cross-sectional shape of which corresponds to the shape of a paraboloid, or advantageously to the shape of a semi-circle. According to the invention, in this is manner, a "cake mould" structure is formed.

The conical shapes of the edge section of the bottom part and of the inner part of the reactor can be similar or different, and the cone angles can be selected, e.g., from about 1 degree to about to 30 degrees. Similarly, the height of the bottom part, i.e. the distance from the lowest point of the bottom of the reactor to the flow division plate may vary considerably depending on the dimensions of the reactor. Consequently, this distance may be in the range of about $0.3 \times D$ to about $0.5 \times D$, where D is the diameter of the reactor.

The circulating gas is conducted into the bottom part of the reactor through apertures 20 formed in the lowest part of the bottom structure of the reactor. There may be one or more of such apertures, but it is in general desirable to use three or more symmetrically positioned flow apertures.

The cake mold bottom structure of the invention provides additional advantages in reactors provided with a mixer. The mixing shaft taken through the bottom usually requires a journal bearing inside the reactor which might cause disturbances in the functioning of the fluidized bed. In the bottom part of the reactor according to the invention, the journal bearing can be affixed to the upper end of the uplifted center part of the bottom, so that no supporting bearings are needed within the reactor.

The examples provided above are not meant to be exclusive. Many other variations of the present invention would be obvious to those skilled in the art, and are contemplated to be within the scope of the appended claims.

I claim:

1. In an olefin polymerization fluidized red reactor reactor having a cylindrical space for polymerizing olefins in a fluidized bed formed by polymerizing polymer particles and means for supplying as a circulating gas a flow of at least one of gaseous hydrocarbon diluents and monomers into said bed of polymerizing polymer particles through a flow division plate arranged in a bottom portion of said cylindrical space, the improvement comprising:

means defining an annular space below said flow division plate and comprising an inner wall defined by an upwards tapering rotatable conical surface, an outer wall defined by a downwards tapering rotatable conical surface and a bottom surface section, said bottom surface section being arranged between said inner wall and said outer wall and having a rounded cross-section, said means for supplying the flow of gaseous hydrocarbon diluents and/or monomers being connected to said rounded bottom surface section.

2. The fluidized bed reactor of claim 1, wherein said annular surface has a parabolic cross-section.

3. The fluidized bed reactor of claim 1, wherein said annular surface has a semi-circular cross-section.

4. The fluidized bed reactor of claim 1, wherein said annular surface is a ring connecting said rotatable conical surfaces.

5. The fluidized bed reactor of claim 1, wherein said means for supplying a circulating gas comprise feed apertures arranged in said annular surface such that the circulating gas is fed through said feed apertures into the lower part of the reactor.

6. The fluidized bed reactor of claim 5, wherein said feed apertures direct the circulating gas into the lowest point of said lower part.

7. The fluidized bed reactor of claim 1, further comprising a mixing shaft for mixing the polyolefins in said bed, said mixing shaft having a bearing supported on an uplifted center part of said upwards tapering conical surface.

8. The fluidized bed reactor of claim 7, wherein said bearing is arranged outside of the reactor.

9. The fluidized bed reactor of claim 1, wherein said upwards tapering conical surface forms an uplifted center part in the lower part of the reactor, said flow division plate being supported on said uplifted center part.

10. The fluidized bed reactor of claim 5, wherein said feed apertures are symmetrically arranged in said annular surface.

11. The fluidized bed reactor of claim 1, wherein said annular space in the lower part of the reactor is a mixing chamber in which the circulating gas is mixed.

12. The fluidized bed reactor of claim 1, wherein said inner wall has a cone angle of from about 1° to about 30° and said outer wall has a cone angle of from about 1° to about 30°.

13. An olefin polymerization fluidized bed reactor in which olefins are polymerized or copolymerized, comprising an olefin fluidized bed reactor having an upper part and a lower part,
a bed in which olefins are polymerized or copolymerized to form polyolefins, said bed means being arranged in the upper part of the reactor,
means for supplying a circulating gas into the lower part of the reactor, the circulating gas being uniformly distributed across the cross-sectional area of the lower part of the reactor, and
a flow division plate for separating the lower part of the reactor from the upper part of the reactor, the circulating gas passing through said flow division plate and causing the olefins to become fluidized in the upper part of the reactor by the circulating gas,
said lower part comprising means defining an annular space, said means comprising a circular bottom surface section, an inner wall defined by an upwards tapering rotatable conical surface and an outer wall defined by a downwards tapering rotatable conical surface, said bottom surface section being arranged between said inner wall and said outer wall such that an annular space is defined between said flow division plate, said inner wall, said outer wall and said bottom surface section, said bottom surface section of said lower part comprising an annular surface having a rounded cross-section,
said means for supplying a circulating gas being connected to said rounded cross-section annular surface of said lower part.

14. In a method for polymerizing or copolymerizing olefins in a fluidized bed reactor, comprising providing a bed in an upper part of a reactor in which olefins are polymerized or copolymerized to form polyolefins, circulating gas flow of at least one of hydrocarbon diluents and monomers into a lower part of the reactor and passing said circulating gas from the lower part of the reactor through separating means to the upper part of the reactor to fluidize the olefins in the upper part of the reactor, the improvement comprising the steps of:

providing an annular space in said lower part between an inner upwards tapering rotatable conical surface and an outer downwards tapering rotatable conical surface, and providing an annular surface having a rounded cross-section between said outer conical surface and said inner conical surface to constitute a bottom surface section of said annular space, the gas being directed into the lower part of the reactor through the annular surface.

15. The method of claim 14, further comprising distributing the gas uniformly across the cross-sectional area of the lower part of the reactor.

16. The method of claim 14, further comprising connecting the annular surface to said outer and inner conical surfaces.

17. The method of claim 14, further comprising mixing the olefins in the bed by means of a mixing shaft, and supporting a bearing of the mixing shaft on an uplifted center part of the outer tapering conical surface.

18. The method of claim 14, further comprising arranging in a symmetrical arrangement apertures in the annular surface through which the gas is directed into the lower part of the reactor.

19. The method of claim 18, wherein said apertures direct the circulating gas into the lowest point of the lower part of the reactor.

20. The method of claim 14, further comprising mixing the gas in the lower part of the reactor.

* * * * *